Aug. 7, 1923.

G. P. WHITELAW, 2D

VALVE

Filed Aug. 19, 1920

1,464,303

Inventor:
George P. Whitelaw II
by Cox & Dann
His Attorneys.

Patented Aug. 7, 1923.

1,464,303

UNITED STATES PATENT OFFICE.

GEORGE P. WHITELAW, 2D, OF ST. LOUIS, MISSOURI.

VALVE.

Application filed August 19, 1920. Serial No. 404,616.

*To all whom it may concern:*

Be it known that I, GEORGE P. WHITELAW, 2d, a citizen of the United States, and a resident of the city of St. Louis and State of Missouri, have invented a new and useful Improvement in Valves, of which the following is a specification.

My invention relates to valves, and has for its principal objects to provide a snap-action valve of simple construction and suitable for use in connection with gas water heaters. The invention consists principally in a valve operated by means of a continuous coil spring adapted to engage a circular knife-edge on the valve-operating stem. The invention further consists in the parts and combinations of parts hereinafter described and claimed.

Figure 1:
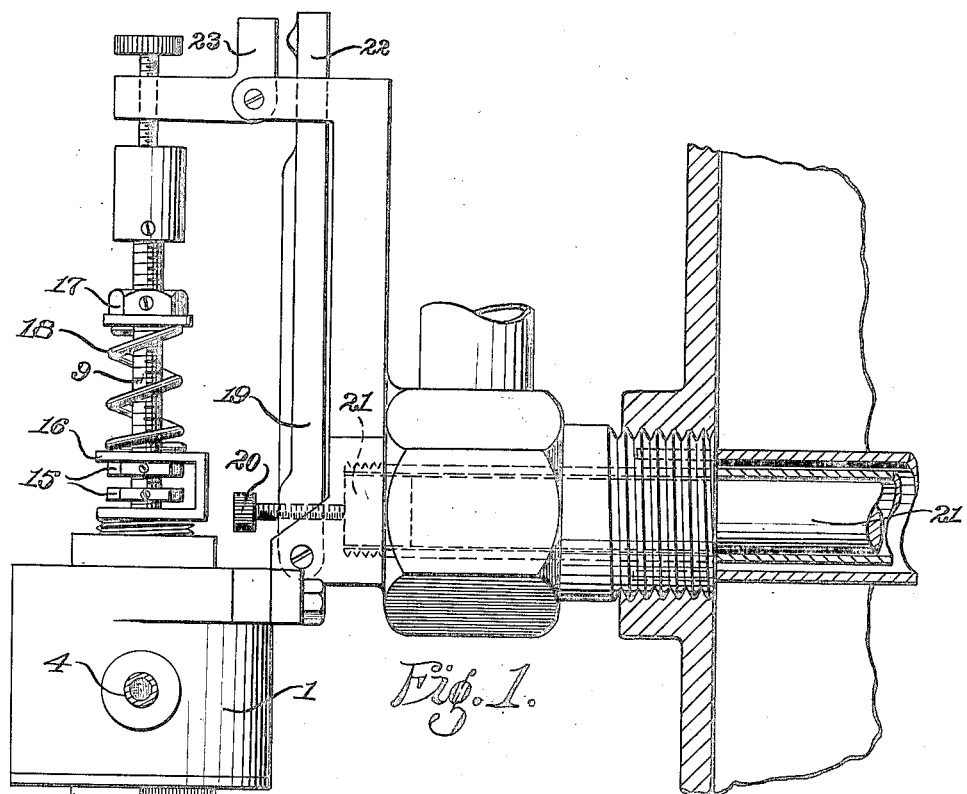
Figures 2, 3:
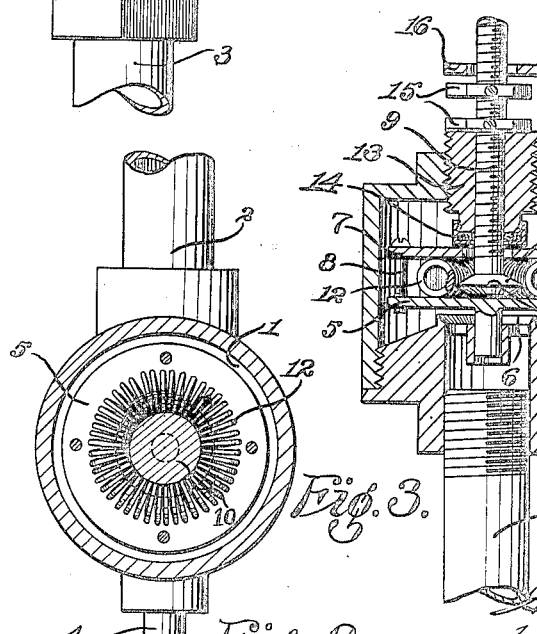
Figure 4:
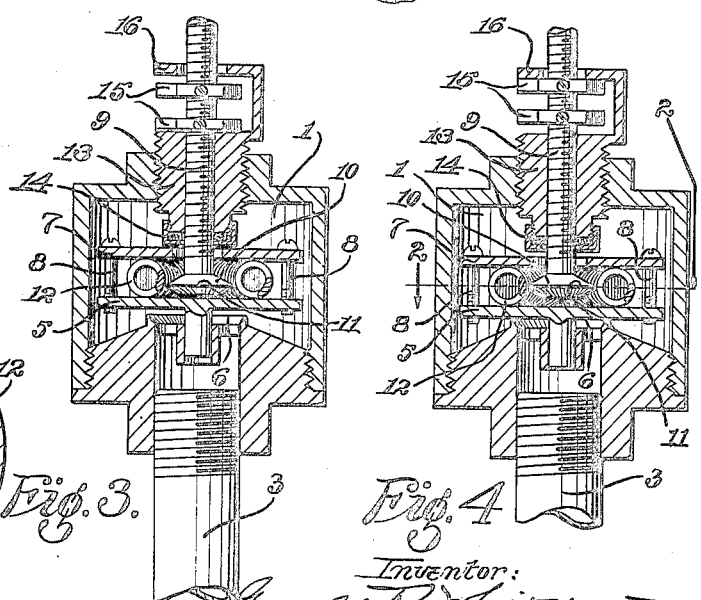

In the drawing, which forms part of this specification, and wherein like reference characters indicate like parts wherever they occur, Fig. 1 is an elevation of a valve mechanism embodying my invention, Fig. 2 is a horizontal sectional view on the line 2—2 of Fig. 4.

Fig. 3 is a vertical sectional view of a part of the valve mechanism showing the valve in open position, and Fig. 4 is a similar view showing the valve in closed position.

A valve chamber 1 has a gas inlet pipe 2, a main outlet pipe 3 leading to a gas burner (not shown) and a small outlet pipe 4 leading to a pilot light (not shown). A thermostatically operated valve is provided for the main outlet pipe.

The valve proper comprises a flat leaf 5 which normally rests on a seat 6 provided therefor at the opening into the outlet pipe 3. A plate 7 is disposed parallel to and spaced from said valve leaf 5 and is secured thereto, by screws 8 or other suitable means. A valve operating stem 9 projects through a hole in the middle of said plate. Said operating stem has an enlarged head or disk portion 10 whose periphery is beveled to form a circular knife-edge 11. An annular helical spring 12 under tension is arranged between said valve leaf and plate and encircles said head 10. The diameter of said spring 12 is substantially the same as the space between said valve leaf and said plate; so that the spring is held in a housing formed by said valve leaf and plate 7 and thus prevented from riding inwardly over the edge of the disk 10 when engaged by the disk at a point midway between the valve leaf and plate, as shown in Fig. 4.

The operating stem is movable lengthwise in a guide member 13 provided therefor in the valve housing. A suitable packing 14 is provided for said stem to prevent leakage of gas from the valve chamber. Said stem is screwthreaded and provided with nuts 15. Said nuts 15 co-operate with the upper end of said guideway and with a suitable stop 16, above said guide member and secured thereto, thus limiting the movement of the stem. Said stem 9 is provided with a nut 17 near the upper end thereof. A helical spring 18 is arranged on the stem between the upper stop 16 and the nut 17, and tends to keep the operating stem in its uppermost position.

The valve is operated by the spring 12 co-operating with the beveled head 10. When the stem is lowered the spring tends to contract on the disk and thus snaps the valve leaf off the seat. When the stem is raised the valve is forced downward on to the seat. Said spring tends to contract on the disk 10, but is prevented from doing so when the knife edge engages the central part of the spring.

The stem is operated by any suitable means, such, for instance, as a system of levers thermostatically controlled. A lever 19 is pivotally secured at its lower end. A screw 20 projects from the lower end portion of said lever in position to be engaged by the end of a suitable thermostatic element 21. The upper end portion 22 of said lever 19 presses against one arm of a bent lever 23, causing the other arm thereof to be depressed and a screw 24 projecting therefrom to press against the head of the valve operating stem 9.

The screws 20 and 24 projecting from the levers 19 and 23 are adjustable so that the temperature at which the valve operates can be regulated and the movement of the stem can be regulated.

The valve described is quick in its operation, its construction is simple and it is easily adjusted. The valve seat can easily be ground to fit the flat valve shown, thus preventing leakage of gas.

I have described my invention as embodied in a valve, but it is obvious that it is useful in other constructions, as snap action.

What I claim is:

1. A snap action valve mechanism comprising spaced members constituting a movable housing, an operating stem projecting into said housing, said stem having an enlarged end portion within the housing, and an annular helical spring within the housing engaging said enlarged end portion to operate said mechanism, said enlarged end portion being beveled at its periphery and normally engaging the middle portion of said spring whereby a very slight movement of said operating stem actuates said valve mechanism.

2. A valve seat, a valve therefor, a plate disposed parallel to and spaced from said valve and secured thereto, said plate having a hole therein, an operating stem having an end portion extending through the hole in said plate into the space between said valve and said plate and an annular helical spring engaging the end portion of the stem to operate said valve.

3. A valve seat, a valve therefor, a plate secured to said valve and spaced therefrom to form a housing, said plate having a hole therein, a valve operating stem passing through said hole, said stem having an enlarged end portion within said housing provided with a circumferential knife-edge, and an annular helical spring in said housing and engaging said enlarged end portion of said operating stem.

4. A valve, a seat therefor, a plate disposed parallel to and spaced from said valve and secured thereto, an operating stem having its end portion extending through said plate into the space between said valve and said plate, an annular helical spring confined between said valve and said plate and engaging the end portion of said stem to operate said valve, and adjustable means for regulating the movement of said operating stem.

Signed at St. Louis, Missouri, this 12th day of August 1920.

GEORGE P. WHITELAW, 2D.